(12) United States Patent
Hu

(10) Patent No.: US 9,248,439 B2
(45) Date of Patent: Feb. 2, 2016

(54) MOLECULARLY IMPRINTED CATALYSTS AND METHODS OF MAKING AND USING THE SAME

(75) Inventor: Xiaobin Hu, Shanghai (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/412,000

(22) PCT Filed: Jul. 6, 2012

(86) PCT No.: PCT/CN2012/078276
§ 371 (c)(1),
(2), (4) Date: Dec. 30, 2014

(87) PCT Pub. No.: WO2014/005320
PCT Pub. Date: Jan. 9, 2014

(65) Prior Publication Data
US 2015/0174568 A1      Jun. 25, 2015

(51) Int. Cl.
*C02F 1/32*        (2006.01)
*B01J 31/38*       (2006.01)
(Continued)

(52) U.S. Cl.
CPC .............. *B01J 31/38* (2013.01); *B01J 21/063* (2013.01); *B01J 31/067* (2013.01); *B01J 35/004* (2013.01); *B01J 35/026* (2013.01); *B01J 37/0221* (2013.01); *C02F 1/32* (2013.01); *C02F 1/725* (2013.01); *B01J 31/0212* (2013.01); *B01J 35/0013* (2013.01); *B01J 2231/005* (2013.01); *B01J 2531/004* (2013.01); *C02F 2101/30* (2013.01); *C02F 2101/305* (2013.01);
(Continued)

(58) Field of Classification Search
CPC ........ B01J 21/063; B01J 31/067; B01J 31/38; B01J 35/004; B01J 35/026; B01J 37/0221; C02F 1/32; C02F 1/725
See application file for complete search history.

(56) References Cited

U.S. PATENT DOCUMENTS

| | | | | |
|---|---|---|---|---|
| 6,805,739 | B2 * | 10/2004 | Chiu | ..................... B01J 21/063 106/436 |
| 2004/0248075 | A1 | 12/2004 | Yamaguchi et al. | |
| 2010/0036188 | A1 * | 2/2010 | Steinfeld et al. | .............. 588/309 |

FOREIGN PATENT DOCUMENTS

| | | |
|---|---|---|
| CN | 101491757 A | 7/2009 |
| CN | 102319591 A | 1/2012 |

OTHER PUBLICATIONS

Baggiani, C., et al., "Molecularly imprinted polymer/cryogel composites for solid-phase extraction of bisphenol a from river water and wine," Analytical & Bioanalytical Chemistry, vol. 397, No. 2, pp. 815-822 (May 2010).

(Continued)

*Primary Examiner* — Walter D Griffin
*Assistant Examiner* — Cameron J Allen
(74) *Attorney, Agent, or Firm* — Knobbe, Martens, Olson & Bear, LLP

(57) ABSTRACT

Molecularly imprinted catalysts are disclosed. The catalysts can include a core and a layer at least partially encapsulating the core. The core can include a titania-based photocatalyst. The layer can include titania covalently coupled to one or more silane coupling agents having an organic functional group. The layer can also include one or more molecular-sized cavities configured to selectively receive one or more contaminants. Also disclosed herein are methods of making and using the molecularly imprinted catalyst, as well as apparatuses and compositions including the molecularly imprinted catalyst.

14 Claims, 2 Drawing Sheets

(51) Int. Cl.
  *B01J 31/06*  (2006.01)
  *C02F 1/72*  (2006.01)
  *B01J 21/06*  (2006.01)
  *B01J 35/02*  (2006.01)
  *B01J 37/02*  (2006.01)
  *B01J 31/02*  (2006.01)
  *C02F 101/30*  (2006.01)
  *C02F 101/32*  (2006.01)
  *C02F 101/34*  (2006.01)
  *B01J 35/00*  (2006.01)
  *C02F 103/00*  (2006.01)

(52) U.S. Cl.
  CPC ..... *C02F2101/322* (2013.01); *C02F 2101/345* (2013.01); *C02F 2103/007* (2013.01); *C02F 2201/32* (2013.01); *C02F 2305/02* (2013.01); *C02F 2305/08* (2013.01); *C02F 2305/10* (2013.01)

(56) References Cited

OTHER PUBLICATIONS

Byrne, M.E., et al., "Molecular imprinting within hydrogels," Advanced Drug Delivery Reviews, Recent Developments in Hydrogels, vol. 54, No. 1, pp. 149-161 (Jan. 17, 2002).
Gardin, S., et al., "Synthesis of 3-glycidoxypropyltrimethoxysilane-TiO2 UV-sensitive waveguides," Proc. SPIE, Organic Optoelectronics and Photonics II, vol. 6192, pp. 619232.1-619232.9 (Apr. 20, 2006).
Han, D. M., et al., "Preparation and photocatalytic activity of Cu2+ 34 -doped 2, 4-dichlorophenol molecularly imprinted SiO2-TiO2 nanocomposite," Micro & Nano Letters, vol. 5, No. 2, pp. 76-80 (2010).
Hanson, D.J., "Canada Lists BPA As Toxic Compound," Chemical & Engineering News, vol. 88, No. 42, pp. 22 (Oct. 18, 2010).
Haupt, K., "Imprinted polymers-Tailor-made mimics of antibodies and receptors," Chem. Commun., No. 2, pp. 171-178 (2003).
He, Q., et al., "Synthesis and applications of surface-grafted Th(IV)-imprinted polymers for selective solid-phase extraction of thorium(IV)," Anal Chim Acta., vol. 605, No. 2, pp. 192-197 (Dec. 19, 2007).
Hu, X., et al., "Construction of self-reporting specific chemical sensors with high sensitivity," Advanced Materials, vol. No. 24, pp. 4327-4332 (Dec. 2007).
International search report and written opinion for PCT application No. PCT/CN2012/078276 mailed on Apr. 18, 2013.
Jiang, M., et al., "Selective molecularly imprinted stationary phases for bisphenol A analysis prepared by modified precipitation polymerization," Journal of Separation Science, vol. 32, No. 19, pp. 3265-3273A (Oct. 2009).
Katz A., and Davis, M.E., "Molecular imprinting of bulk, microporous silica," Letters to Nature, vol. 403, pp. 286-289 (Jan. 20, 2000).
Lahav, M., et al., "Imprinting of chiral molecular recognition sites in thin TiO2 films associated with field-effect transistors: novel functionalized devices for chiroselective and chirospecific analyses," Chemistry—A European Journal, vol. 7, No, 18, pp. 3992-3997 (Sep. 17, 2001).
Lee, J.W., et al., "Adsorption and photocatalytic degradation of bisphenol A using TiO2 and its separation by submerged hollowfiber ultrafiltration membrane," J Environ Sci (China), vol. 18, No. 1, pp. 193-200 (2006).
Li, C., et al., "Synthesis, characterization, and adsorption performance of Pb(II)-imprinted polymer in nano-TiO2 matrix," J Environ Sci (China), vol. 21, No. 12, pp. 1722-1729 (2008).
Purifics Inc., "Briefing: Photo-Cat Water Purification for Potable & Reuse," accessed at http://web.archive.org/web/20110410084638/ http://www.purifics.com/solutions/pdf/Briefing%20-%20Photo-Cat%Water%20Purification%20for%20Potable%20%26%20Reuse.pdf, revised on Nov. 13, 2008, pp. 1-2.
Sharabi, D., and Paz, Y., "Preferential photodegradation of contaminants by molecular imprinting on titanium dioxide," Applied Catalysis B: Environmental, vol. 95, No. 1-2, pp. 169-178 (Mar. 12, 2010).
Shen, X., et al., "Enhanced photocatalytic degradation and selective removal of nitrophenols by using surface molecular imprinted titania," Environmental Science Technology, vol. 42, pp. 1687-1692 (Feb. 2, 2008).
Turner, N.W., "From 3D to 2D: A review of the molecular imprinting of proteins," Biotechnol. Prog., vol. 22, No. 6, pp. 1474-1489 (2006).
Voith, M., "Canned Foods: Many companies plan to phase out use of chemical in product containers, survey finds," vol. 88, No. 43, pp. 10 (Oct. 25, 2010).
Wang, R., et al., "Photocatalytic degradation of Bisphenol A (BPA) using immobilized TiO2 and UV illumination in a horizontal circulating bed photocatalytic reactor (HCBPR)," Journal of hazardous materials, vol. 169, Issues 1-3, pp. 926-932 (Sep. 2009).
Xie, C., et al., "Molecular imprinting at walls of silica nanotubes for TNT recognition," Anal. Chem., vol. 80, No. 2, pp. 437-443 (2008).
Yang, D., et al., "Fabrication of glucose-sensitive-TiO2 ultrathin films by molecular imprinting and selective detection of monosaccharides," Sensors and Actuators B: Chemical, Proceedings of the Eleventh International Meeting on Chemical Sensors IMCS-11—IMCS 2006, vol. 130, No. 1, pp. 379-385 (Mar. 14, 2008).
Yang, D.-H., et al., "Design of highly efficient receptor sites by combination of cyclodextrin units and molecular cavity in TiO2 ultrathin layer," Biosensors and Bioelectronics, vol. 22, Issue 3, pp. 388-392 (Sep. 15, 2006).
Yang, D.-H., et al., "Simple method of the fabrication of 1-hydroxypyrene-imprinted TiO2 gel nanofilms," Current Applied Physics, Nano Korea 2008 Symposium, vol. 9, No. 9, pp. e136-r139 (Mar. 2009).
Yao, Q., and Zhou, Y., et al., "Synthesis of TiO2 hybrid molecular imprinted nanospheres linked by silane coupling agent," Journal of Inorganic and Organometallic Polymers and Materials, vol. 19, pp. 466-472 (Dec. 2009).
Zaleska, A., "Recent Patents on Engineering," Doped-TiO2: A Review, vol. 2, pp. 157-164 (2008).
Zhao, W., et al., "Preparation of dummy template imprinted polymers at surface of silica microparticies for the selective extraction of trace bisphenol A from Water samples," Journal of Hazardous Materials, vol. 179, pp. 223-229 (Jul. 15, 2010).

* cited by examiner

MOLECULARLY IMPRINTED CATALYSTS AND METHODS OF MAKING AND USING THE SAME

CROSS-REFERENCE TO RELATED APPLICATIONS

This application is the U.S. National Phase under 35 U.S.C. §371 of International Application No. PCT/CN2012/078276, filed Jul. 6, 2012, which is hereby incorporated by reference in its entirety.

BACKGROUND

Pollution of aqueous solutions and air is an expanding problem in the modern world. An ever-growing number of toxic pollutants are produced by industries, such as, for example, textile industries, chemical industries, pharmaceutical industries, pulp and paper industries, and food processing plants. The majority of these toxic pollutants are released within two primary fluid physical states: water and air. As the scope of water and air-borne pollutant production increases worldwide, the dangers imposed by these released pollutants on the environment also increases. Additionally, environmental regulations are requiring that these released fluid streams contain less and less pollutants. In fact, some treatment processes that were acceptable options at one point in time are now obsolete because lower treatment standards are required as new environmental regulations are implemented on the state and federal level.

A variety of wastewater purification methods have been developed. Some techniques for removing the contaminants involve use of strong oxidants, which may themselves be hazardous. Other techniques remove the contaminant from the fluid but then release the contaminant into the air or produce a contaminant output, which must be disposed of.

SUMMARY

Some embodiments disclosed herein include a molecularly imprinted catalyst having a core containing a titania-based photocatalyst and a layer at least partially encapsulating the core. The layer can include titania covalently coupled to one or more silane coupling agents having an organic functional group. The layer can further include one or more molecular-sized cavities configured to selectively receive one or more contaminants.

Some embodiments disclosed herein include a method of making a molecularly imprinted catalyst, the method including: combining one or more silane coupling agents and one or more contaminants to form a complex; combining one or more reactive titania precursors with the complex to form a suspension; combining the suspension with one or more nanoparticles having a titania-based photocatalyst to form a molecularly imprinted structure on the nanoparticles; and removing at least a portion of the contaminants from the molecularly imprinted structure on the nanoparticles.

Some embodiments disclosed herein include a molecularly imprinted catalyst prepared according to any of the methods disclosed in the present application.

Some embodiments disclosed herein include a method of degrading a contaminant, the method including: combining a molecularly imprinted catalyst with a contaminant and exposing the molecularly imprinted catalyst to a radiation effective to degrade at least a portion of the contaminants. The molecularly imprinted catalyst can include: a core having a titania-based photocatalyst and a layer at least partially encapsulating the core. The layer can include titania covalently coupled to one or more silane coupling agents having an organic functional group. The layer can further include one or more molecular-sized cavities configured to selectively receive the contaminant.

Some embodiments disclosed herein include an apparatus for degrading a contaminant, the apparatus including a molecularly imprinted and a light source configured to emit radiation that, when received by the molecularly imprinted catalyst in contact with the contaminants, is effective to degrade at least a portion of the contaminants. The molecularly imprinted catalyst can include: a core having a titania-based photocatalyst and a layer at least partially encapsulating the core. The layer can include titania covalently coupled to one or more silane coupling agents having an organic functional group. The layer can further include one or more molecular-sized cavities configured to selectively receive the contaminant.

Some embodiments disclosed herein include a film having an inert polymer and a molecularly imprinted catalyst dispersed within the inert polymer. The molecularly imprinted catalyst can include: a core having a titania-based photocatalyst and a layer at least partially encapsulating the core. The layer can include titania covalently coupled to one or more silane coupling agents having an organic functional group. The layer can further include one or more molecular-sized cavities configured to selectively receive the contaminant.

Some embodiments disclosed herein include a method including: providing a sample suspected of containing a contaminant; combining a molecularly imprinted catalyst with the sample; and exposing the molecularly imprinted catalyst to a radiation effective to degrade the contaminant. The molecularly imprinted catalyst can include: a core having a titania-based photocatalyst and a layer at least partially encapsulating the core. The layer can include titania covalently coupled to one or more silane coupling agents having an organic functional group. The layer can further include one or more molecular-sized cavities configured to selectively receive the contaminant.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
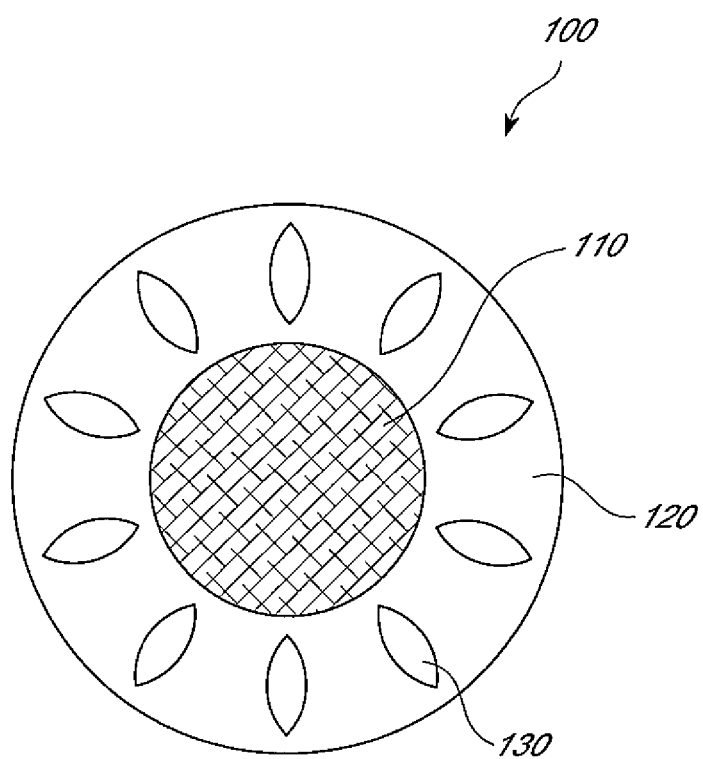
FIG. 1 shows one example of a molecularly imprinted catalyst that is within the scope of the present application (not to scale).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Disclosed herein are molecularly imprinted catalysts. The catalysts can include a core and a layer at least partially encapsulating the core. The core can include a titania-based photocatalyst. The layer can include titania covalently coupled to one or more silane coupling agents having an organic functional group. The layer can also include one or more molecular-sized cavities configured to selectively receive one or more contaminants. Also disclosed herein are methods of making and using the molecularly imprinted catalyst, as well as apparatuses and compositions including the molecularly imprinted catalyst.

DEFINITIONS

As used herein, "alkyl" refers to a straight or branched hydrocarbon chain that comprises a fully saturated (no double or triple bonds) hydrocarbon group. The alkyl group of the compounds may be designated as "$C_1$-$C_4$ alkyl" or similar designations. By way of example only, "$C_1$-$C_4$ alkyl" indicates that there are one to four carbon atoms in the alkyl chain, i.e., the alkyl chain is selected from methyl, ethyl, propyl, iso-propyl, n-butyl, isobutyl, sec-butyl, and t-butyl. Typical alkyl groups include, but are in no way limited to, methyl, ethyl, propyl, isopropyl, butyl, isobutyl, tertiary butyl, pentyl, hexyl, and the like.

As used herein, the term "hydroxyl" refers to a —OH group.

As used herein, the term "silanol" refers to a —Si—OH group.

As used herein, the term "acyloxy" refers to —OC(O)-alkyl. In some embodiments, acyloxy can be —OC(O)—$C_{1-6}$ alkyl. Non-limiting examples of acyloxy substituents include acetoxy, propionyloxy, butyryloxy, and the like.

As used herein, the term "alkoxy" refers to —O-alkyl. In some embodiments, alkoxy can be —O—$C_{1-6}$ alkyl (or referred to as "$C_{1-6}$ alkoxy"). Non-limiting examples of alkoxy substituents include methoxy, ethoxy, propoxy, iso-propoxy, butoxy, isobutoxy, and the like.

Molecularly Imprinted Catalysts

FIG. 1 shows one example of a molecularly imprinted catalyst that is within the scope of the present application (not to scale). Molecularly imprinted catalyst 100 includes core 110 encapsulated by layer 120 having plurality of molecular-sized cavities 130. In some embodiments, the molecularly imprinted catalyst can be configured to selectively decompose a contaminant. For example, molecular-sized cavities 130 may be dimensioned to be about the same size as a bisphenol A molecule, so that bisphenol A fits inside molecular-sized cavities 130 and can be decomposed by the catalyst.

The core of the molecularly imprinted catalyst (e.g., core 110 depicted in FIG. 1) can include a titania-based catalyst. The titania-based catalyst can include titania (i.e., titanium dioxide) in an amount that is effective for the molecularly imprinted catalyst to exhibit photocatalytic activity. The amount of titania in the titania-based catalyst can be, for example, at least about 50% by weight; at least about 70% by weight; at least about 90% by weight; at least about 95% by weight; or at least about 98% by weight. The amount of titania in the titania-based catalyst can be, for example, less than or equal to about 100% by weight; less than or equal to about 99.5% by weight; less than or equal to about 98% by weight; less than or equal to about 95% by weight; or less than or equal to about 90% by weight. In some embodiments, the amount of titania in the titania-based catalyst can be from about 50% by weight to about 100% by weight.

The titania within the titania-based catalyst may optionally be doped with one or more metal or non-metal dopants. Non-limiting examples of dopants include chromium, vanadium, iron, nitrogen, carbon, boron, sulfur, phorphorous, iodine, silver, gold, and platinum. A review of various doped titania-based catalysts is provided in Zeleska, A., *Recent Patents on Engineering*, Vol. 2, pp. 157-164 (2008).

The titania-based photocatalyst may include rutile, anatase, or brookite phases. In some embodiments, the titania-based photocatalyst includes an anatase phase. The titania-based photocatalyst may include, for example at least about 50% by weight of an anatase phase; at least about 75% by weight of an anatase phase; at least about 90% by weight of an anatase phase; or at least about 95% by weight of an anatase phase.

The shape of the core is not particularly limited and can vary. The core may have a largest dimension, for example, of at least about 10 nm; at least about 25 nm; at least about 50 nm; at least about 100 nm; at least about 250 nm; at least about 500 nm; or at least about 1 μm. The largest dimension of the core can be, for example, no more than about 1 μm; no more than about 750 nm; no more than about 500 nm; no more than about 250 nm; no more than about 100 nm; or no more than about 75 nm. The core can be spherical, rod-shaped, ellipsoidal, or any other shape. In some embodiments, the core has an aspect ratio of about 1 to about 1000. In some embodiments, the core has an aspect ratio of less than or equal to about 5. The core can be porous or non-porous. In some embodiments, the core can be a nanoparticle.

The core may be prepared, in some embodiments, from various commercially available titania-based photocatalysts. For example, the core may include DEGUSSA P25 $TiO_2$ or HOMBIKAT UV 100. The commercially available titania-based catalysts may optionally be reduced in size via comminution (e.g., ball milling) or other known techniques. The core may also be prepared using conventional sol-gel chemistry techniques. For example, an appropriate titanium alkoxide, such as titanium ethoxide, titanium isopropoxide, and titanium methoxide, can be hydrolyzed and condensed in an aqueous solution to yield colloidal titania structures (e.g., nanoparticles). Varying the reaction conditions, such as temperature, pH, and concentration, may affect the final structure of the titania. In some embodiments, the titania may be heated to activate the catalyst and remove moisture. For example, the titania may be heated at a temperature of about 110° C. for up to about 2 hours.

The layer of the molecularly imprinted catalyst (e.g., layer 120 depicted in FIG. 1) can include titania covalently coupled to one or more silane coupling agents. In some embodiments, the silane coupling agents can be represented by the formula: $R_nSiX_{(4-n)}$, where R can be one or more non-hydrolyzable organic groups; X is a hydrolyzable group, such as $C_{1-6}$ alkoxy, acyloxy, amine, or chlorine; and n is 1, 2, or 3. In some embodiments, X is $C_{1-6}$ alkoxy and n is 1. In some embodiments, the non-hydrolyzable organic group can have functionality to form an energetically favorable interaction with a contaminant. For example, the silane coupling group can be 3-glycidoxypropyltrimethoxysilane, which includes an epoxide that may form a hydrogen-boding interaction with a hydroxyl-group-containing contaminant (e.g., bisphenol A). As another example, the silane coupling group can be phenyltrimethoxysilane, which includes a phenyl group which may form a pi-stacking interaction with an aryl-group-containing contaminant (e.g., naphthalene).

As will be discussed further below, the silane coupling group can react with titania or a reactive titania precursor to form a covalent bond with titania. This may be achieved by combining the silane coupling agent with reactive titania precursors or titania in an aqueous solution. Without being bound to any particular theory, it is believed the hydrolyzable groups on the silane coupling agent (e.g., X in formula: $R_nSiX_{(4-n)}$) can be hydrolyzed and the resulting silanol groups may condensate with hydroxyl groups on the titania or reactive titania precursors to form the covalent bond.

Non-limiting examples of silane coupling agents include N-(2-aminoethyl)-3-aminopropyltrimethoxysilane, N-(2-aminoethyl)-3-aminopropylmethyldimethoxysilane, 3-aminopropylmethyldiethoxysilane, 3-aminopropyltriethoxysilane, 3-aminopropyltrimethoxysilane, (N-trimethoxysilylpropyl)polyethyleneimine, trimethoxysilylpropyldiethylenetriamine, 3-chloropropyltrimethoxysilane, 1-trimethoxysilyl-2(p,m-chloromethyl)phenylethane, 2-(3,4-epoxycyclohexyl)ethyltrimethoxysilane, 3-glycidoxypropyltrimethoxysilane, isocyanotopropyltriethoxysilane, bis[3-(triethoxysilyl)propyl]tetrasulfide, 3-mercaptopropylmethyldimethoxysilane, 3-(Aminoethylaminomethyl)-phenyltrimethoxysilane, carboxyethylsilanetriol, N-(3-triethoxysilylpropyl)-4,5-dihydroimidazole, decyltriethoxysilane, hydroxymethyltriethoxysilane, isobutylmethyldimethoxysilane, 3-mercaptopropyltriethoxysilane, phenyltrimethoxysilane, N-trimethoxysilylpropyl-N,N,N-trimethylammonium chloride, ureidopropyltriethoxysilane, and 3-mercaptopropyltrimethoxysilane. Two or more different silane coupling agents can optionally be present in the layer.

In some embodiments, the silane coupling agent has a molecular weight less than or equal to about 600 Da. In some embodiments, the silane coupling agent has a molecular weight less than or equal to about 400 Da. In some embodiments, the silane coupling agent is non-polymeric. That is, the silane coupling agent does not include a repeating structural unit more than about 10 times.

The amount of silane coupling agents can vary and may, for example, be proportional to a number of molecular-sized cavities in the layer (e.g., molecular-sized cavities 120 in FIG. 1). The molar number of silane coupling agents in the layer relative to a number of molecular-sized cavities in the layer can be, for example, at least about 0.5; at least about 1; at least about 2; at least about 3; or at least about 5. The molar number of silane coupling agents in the layer relative to a number of molecular-sized cavities in the layer can be, for example, less than or equal to about 10; less than or equal to about 7; less than or equal to about 5; less than or equal to about 3; or less than or equal to about 1. In some embodiments, the molar number of silane coupling agents in the layer relative to a number of molecular-sized cavities in the layer can be from about 0.5 to about 10.

The amount of titania in the layer can be greater than the amount silane coupling agents. The layer may include, for example, at least about 50% by titania; at least about 75% by weight titania; or at least about 90% by weight titania. In some embodiments, the layer is substantially free of polymer (e.g., no more than trace amounts of polymer). In some embodiments, the molecularly imprinted catalyst is substantially free of a polymer (e.g., no more than trace amounts of polymer).

The type and amount of silane coupling agents may, for example, vary depending upon the contaminant that the molecularly imprinted catalyst is configured to decompose. For example, if the targeted contaminant includes two hydroxyl groups (e.g., bisphenol A), the layer may include about two silane coupling agents capable of forming a hydrogen bond with the hydroxyl groups on the contaminant (e.g., 3-glycidoxypropyltrimethoxysilane) for every molecular-sized cavity. As another example, if the targeted contaminant includes one phenyl group (e.g., ethylbenzene), the layer may include about one silane coupling agent capable of forming a pi-stacking interaction with the contaminant (e.g., phenyltrimethoxysilane). In some instances, two or more different silane coupling agents may be included to form different interactions with the targeted contaminant. By selecting an appropriate amount and type of silane coupling agent, the molecularly imprinted cavities may, in some embodiments, advantageously exhibit increased selectivity for decomposing the targeted contaminant.

The layer may optionally include pore channels extending between an outer surface of the molecularly imprinted catalyst and the molecular-sized cavities. The pore channel may improve transport of contaminants into the molecular-sized cavities. The pore channels may be formed, in some embodiment, by including an appropriate porogenic agent, such as an alcohol (e.g., ethanol).

The molecular-sized cavities can be configured to selectively receive one or more contaminants. In some embodiments, the molecular-sized cavities can be spatially configured (e.g., appropriately dimensioned) to receive one or more contaminants. In some embodiments, the molecular-sized cavities include one or more silane couplings agents near the surface of the molecular-sized cavities and configured to form an energetically favorable interaction within one or contaminants when received in the molecular-sized cavities. In some embodiments, the molecular-sized cavities include at least one silane coupling group near the surface of the molecular-sized cavities that have an organic functional group configured to form a polar interaction with one or more contaminants, such as a hydrogen bond or ionic bond. In some embodiments, the molecular-sized cavities include at least one silane coupling group near the surface of the molecular-sized cavities have an organic functional group configured to form a non-polar interaction with one or more contaminants, such as a pi-stacking interaction.

The molecular-sized cavities can be configured to selectively receive one or more contaminants. The type of contaminant is not particularly limited, and may, in some embodiments, be selected by using an appropriate template during the process for making the molecularly imprinted catalyst. In some embodiments, substantially all of the molecular-sized cavities are configured to selectively receive the same contaminant. In some embodiments, a first portion of the molecular-sized cavities are configured to selectively receive a first contaminant, and a second portion of the molecular-sized cavities are configured to receive to selectively receive a second contaminant. The number of molecular-sized cavities in the molecularly imprinted catalyst may vary based on, for example, the size of the contaminant. In some embodiments, the molecularly imprinted catalyst includes at least about 10 molecular-sized cavities in the molecularly imprinted catalyst.

Non-limiting examples of contaminants include acetone, acid blue 9, acid yellow 23, acrylamide, alachlor, atrazine, benzene, benzo(a)pyrene, bromodichloromethane, carbofuran, carbon tetrachloride, chlorobenzene, chlorodane, chloroform, chloromethane, 2,4-dichlorophenoxyacetic acid, dalapon, 1,2-dibromo-3-chloropropane, o-dichlorobenzene, p-dichlorobenzene, 1,2-dichloroethane, 1,1-dichloroethylene, cis-1,2-dichloroethylene, trans-1,2-dichloroethylene, dichloromethane, 1,2-dichloropropane, di(2-ethylhexyl)adipate, di(2-ethylhexyl)phthalate, dinoseb, dioxin(2,3,7,8-TCDD), diquat, endothall, endrin, epichlorohydrin, ethylbenzene, ethylene dibromide, glyphosate, a haloacetic acid, heptachlor, heptachlor epoxide, hexachlorobenzene, hexachlorocyclopentadiene, lindane, methyl-tertiary-butyl ether, methyoxychlor, napthoxamyl(vydate), naphthalene, pentachlorophenol, phenol, picloram, isopropylbenzene, N-butylbenzene, N-propylbenzene, sec-butylbenzene, polychlorinated biphenyls (PCBs), simazine, sodium phenoxyacetic acid, styrene, tetrachloroethylene, toluene, toxaphene, 2,4,5-TP (silvex), 1,2,4-trichlorobenzene, 1,1,1-trichloroethane, 1,1,2-trichloroethane, trichloroethylene, a trihalomethane, 1,2,4-trimethylbenzene, 1,3,5-trimethylbenzene, vinyl chloride, o-xylene, m-xylene, p-xylene, a G-series nerve agent, a V-series nerve agent, bisphenol-A, bovine serum albumin, carbamazepine, cortisol, estradiol-17β, gasoline, gelbstoff, triclosan, ricin, a polybrominated diphenyl ether, a polychlorinated diphenyl ether, a polychlorinated biphenyl or a fullerene.

In some embodiments, the contaminant is an endocrine disruptor. In some embodiments, the contaminant is bisphenol A. In some embodiments, the contaminant is a nerve agent. In some embodiments, the contaminant is a pesticide. In some embodiments, the contaminant is a pharmaceutical compound. In some embodiments, the contaminant is a protein. In some embodiments, the contaminant is a dye.

As will be discussed further below, the molecular-sized cavities may, in some embodiments, be obtained by: (i) forming a complex between a contaminant and one or more silane coupling agents; (ii) combining the complex with reactive titania precursors to at least partially encapsulate the contaminant in titania; and (iii) removing the contaminant to yield the molecular-sized cavity within the titania. By using the contaminant as a template, the molecular-sized cavity may exhibit selectivity for receiving the contaminant.

The size of the molecular-sized cavity can vary depending on the contaminant. The largest dimension of the molecular-sized cavity can be, for example, at least about 0.5 nm; at least about 1 nm; at least about 5 nm; at least about 10 nm; or at least about 20 nm. The largest dimension of the molecular-sized cavity can be, for example, less than or equal to about 100 nm; less than or equal to about 50 nm; less than or equal to about 25 nm; less than or equal to about 10 nm; or less than or equal to about 5 nm. In some embodiments, the largest dimension of the molecular-sized cavity can be from about 0.5 nm to about 100 nm. In some embodiments, the molecular-sized cavity is about the same size as the contaminant. For example, the molecular-sized cavity may be about the same size as a molecule of bisphenol A.

Some embodiments disclosed herein include a composition containing molecularly imprinted catalysts. The composition can be a liquid, such as a colloidal solution including water and the molecularly imprinted catalyst. The composition can be a solid, such a polymer matrix containing the molecularly imprinted catalyst.

The amount of the molecularly imprinted catalyst in the composition is not particularly limited. The amount of the molecularly imprinted catalyst in the composition can be, for example, at least about 1 ppm by weight; at least about 10 ppm by weight; at least about 100 ppm by weight; at least about 1000 ppm by weight; or at least about 1% by weight. The amount of the molecularly imprinted catalyst in the composition can be, for example, no more than about 10% by weight; no more than about 5% by weight; no more than about 1% by weight; or no more than about 1000 ppm by weight. In some embodiments, the mount of the molecularly imprinted catalyst in the composition can be from 1 ppm to about 10% by weight.

In some embodiments, the composition includes an inert polymer and the molecularly imprinted catalysts. The molecularly imprinted catalysts may, for example, be embedded in the inert polymer. Generally, any inert polymer may be blended with the molecularly imprinted catalysts; such inert polymers can be, for example, acrylics, polyolefins, polyamides, polyesters, polysulfones, fluoropolymers, vinyl polymers, and the like. For example, the composition can be a blend of the molecularly imprinted catalysts and polyethylene. In some embodiments, the composition can be a film. The film may have a thickness of, for example, less than about 5 mm; less than about 1 mm; or less than about 500 μm. The film can be prepared using conventional methods, such as solvent casting or extrusion.

Method of Making Molecularly Imprinted Catalysts

Some embodiments disclosed herein include a method of making a molecularly imprinted catalyst. The method can, in some embodiments, be used to obtain any of the molecularly imprinted catalysts disclosed in the present application.

Figure 2:
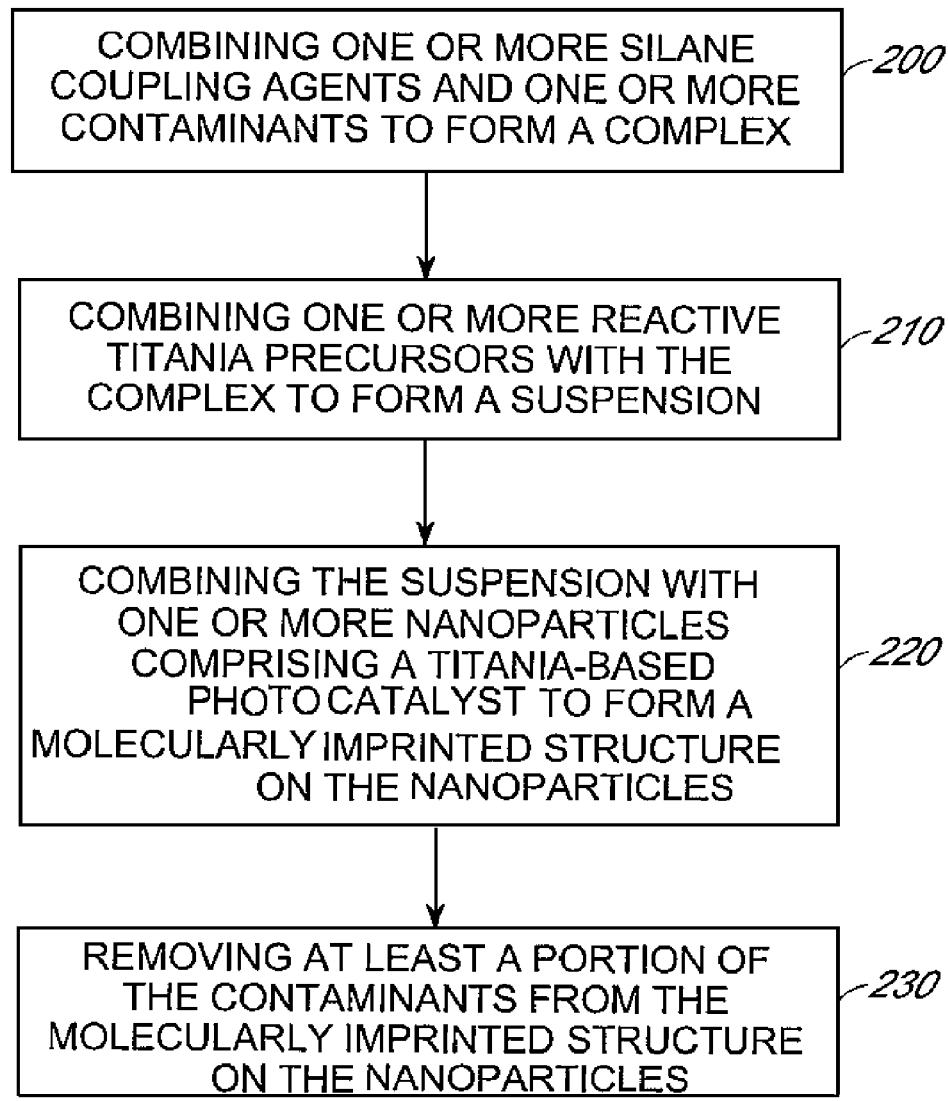
FIG. 2 is a flow diagram showing one example of a process for making the molecularly imprinted catalysts that is within the scope of the present application.

FIG. 2 is a flow diagram showing one example of a process for making the molecularly imprinted catalysts that is within the scope of the present application. The method of making the molecularly imprinted catalysts may include: an operation "Combining one or more silane coupling agents and one or more contaminants to form a complex," illustrated in block 200; an operation "Combining one or more reactive titania precursors with the complex to form a suspension," illustrated in block 210; an operation "Combining the suspension with one or more nanoparticles comprising a titania-based photocatalyst to form a molecularly imprinted structure on the nanoparticles," illustrated in block 220; and an operation "Removing at least a portion of the contaminants from the molecularly imprinted structure on the nanoparticles," illustrated in block 230. Although operations 200, 210, 220, and 230 may be performed sequentially, it will be appreciated that one or more of these operations may be performed at about the same time. These operations may also be performed in a different order than is depicted in FIG. 2.

At operation 200 "Combining one or more silane coupling agents and one or more contaminants to form a complex," one or more contaminants can be mixed with one or more silane coupling agents. The one or more contaminants can be selected so that the molecular-sized cavities in the resulting molecularly imprinted catalyst (e.g., molecular-sized cavities 130 depicted in FIG. 1) can be configured to selectively receive the one or more contaminants. The contaminants can be, for example, any one of the contaminants disclosed in the present application. The silane coupling agents can be, for example, any one of the silane coupling agents disclosed in the present application.

The contaminants and silane coupling agents can be combined, for example, by dispersing (e.g., mixing) the contaminants and silane coupling agents in an appropriate solvent. The solvent is not particularly limited and may be a solvent that does not react with the silane coupling agents or contaminants. In some embodiments, the solvent is an organic solvent. Non-limiting examples of appropriate solvents include methanol, ethanol, acetone, acetic acid, isopropanol, acetonitrile, toluene, 1.4-dioxane, and the like. Two or more solvents can be used. In some embodiments, the solvent is anhydrous.

The contaminants and silane coupling agents may be mixed at suitable times and temperatures to form a complex. In some embodiments, the contaminants and silane coupling agents are mixed for at least about 30 minutes. As an example, the contaminants can be mixed at about room temperature for about 3 hours. The complex obtained may include an energetically favorable interaction between one or more contaminants and one or more silane coupling agents. The interaction may include a polar interaction (e.g., ionic bond or hydrogen bond) or a non-polar interaction (e.g., pi-stacking). In some embodiments, the energetically favorable interaction occurs between at least one non-hydrolyzable group (e.g., X in the formula: $R_n \, SiX_{(4-n)}$) of the silane coupling agent and the contaminant. As one example, two molecules of 3-glycidoxypropyltrimethoxysilane can each form a hydrogen bond with one of the two hydroxyl groups in bisphenol A. Each hydroxyl group may hydrogen bond with the epoxide on the non-hydrolyzable organic group in 3-glycidoxypropyltrimethoxysilane.

The relative amount of the silane coupling agents and contaminants is not particularly limited, and may be selected, for example, depending on the structure and interactions of the compounds. The molar number of silane coupling agents relative to a molar number of contaminants can be, for example, at least about 0.5; at least about 1; at least about 2; at least about 3; or at least about 5. The molar number of silane coupling agents relative to a molar number of contaminants can be, for example, less than or equal to about 10; less than or equal to about 7; less than or equal to about 5; less than or equal to about 3; or less than or equal to about 1. In some embodiments, the molar number of silane coupling agents relative to a molar number of contaminants can be from about 0.5 to about 10.

At operation 210 "Combining one or more reactive titania precursors with the complex to form a suspension," reactive titania precursors can be reacted with the silane compling agents in the complex. The reactive titania precursors can be any compound that is capable of reacting with each other to form titania, and also capable of reacting with the silane coupling agents to form a covalent interaction. In some embodiments, the reactive titania precursors are represented by the formula:

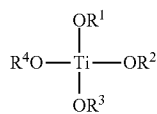

wherein $R^1$, $R^2$, $R^3$, and $R^4$ are each independently selected from the group consisting of hydrogen and $C_{1-6}$ alkyl. Non-limiting examples of reactive titania precursors include titanium ethoxide, titanium isopropoxide, and titanium methoxide. As one example, a molar excess of titanium ethoxide relative to the molar amount of contaminant can be combined with the complex.

The amount of reactive titania precursors may vary, and can be an amount that is effective to form titania that at least partially encapsulates the contaminant. In some embodiments, a molar excess of the reactive titania precursor relative to the molar amount of the contaminant can be combined with the complex. In some embodiments, at least about 100 parts by mole of the reactive titania precursor relative to 1 part by mole of the contaminant are combined with the complex.

The reactive titania precursors may also form a covalent bond with the silane coupling agents. Consequently, in some embodiments, the contaminant can be at least partially encapsulated in titania that includes the silane coupling agents covalently coupled to the titania. The covalent interaction between the silane coupling agent and the titania may maintain the silane coupling agent in a configuration for forming an energetically favorable interaction with the contaminant. As an example, the silane coupling agent 3-glycidoxypropyltrimethoxysilane can be hydrolyzed and condensed with titanium ethoxide to covalently couple the silane coupling agent to titania in a configuration that favors a hydrogen bond with bisphenol A.

The reactive titania precursors can be mixed with the complex and maintained under conditions effective to form titania covalently coupled to the silane coupling agents. For example, the reactive titania precursors may be mixed with complex for at least about 10 minutes at room temperature. An acid or a base may optionally be combined with the composition to catalyze the reaction.

At operation 220 "Combining the suspension with one or more nanoparticles comprising a titania-based photocatalyst to form a molecularly imprinted structure on the nanoparticles," nanoparticles are combined with the suspension to form a molecularly imprinted catalyst. In some embodiments, the titania at least partially encapsulating the contaminant can be covalently coupled to the nanoparticle.

The nanoparticles may, in some embodiments, have the same structure as the core in the molecularly imprinted catalysts (e.g., core 110 depicted in FIG. 1). For example, the nanoparticles can include a titania-based catalyst having at least about 50% by weight of titania, and may include an anatase phase. As discussed above, suitable nanoparticles are commercially available or may be obtained using sol-gel chemistry techniques.

The shape of the nanoparticles is not particularly limited and can vary. The nanoparticles may have an average largest dimension, for example, of at least about 10 nm; at least about 25 nm; at least about 50 nm; at least about 100 nm; at least about 250 nm; at least about 500 nm; or at least about 1 µm. The average largest dimension of the nanoparticles can be, for example, no more than about 1 µm; no more than about 750 nm; no more than about 500 nm; no more than about 250 nm; no more than about 100 nm; or no more than about 75 nm. The nanoparticles can be spherical, rod-shaped, ellipsoidal, or any other shape. In some embodiments, the nanoparticles have an average aspect ratio of about 1 to about 1000. In some embodiments, the nanoparticles have an average aspect ratio of less than or equal to about 5. The nanoparticles can be porous or non-porous.

The nanoparticles can be mixed under suitable conditions for the titania at least partially encapsulating the contaminant in the suspension to be covalently coupled to the nanoparticle. As one example, the nanoparticles may be stirred with the suspension for at least about 3 hours at room temperature.

The amount of nanoparticles combined with the suspension is not particularly limited and may be adjusted, for example, based on the desired thickness of the layer on the molecularly imprinted catalyst (e.g., layer 120 depicted in FIG. 1) and/or the number of molecular-sized cavities (e.g., molecular-sized cavities 130 depicted in FIG. 1). In some embodiments, the number of nanoparticles combined with the suspension is at least 10 times the molar number of contaminants in the suspension. In some embodiments, the number of nanoparticles combined with the suspension is at least 100 times the molar number of contaminants in the suspension.

At operation 230 "Removing at least a portion of the contaminants from the molecularly imprinted structure on the nanoparticles," the contaminants at least partially encapsulated in titania are removed to yield molecular-sized cavities (e.g., yield molecular-sized cavities 130 depicted in FIG. 1). The contaminants can be removed using standard elution procedures. The particular solvents used for elution may vary depending on the properties of the contaminant. For example, relatively polar solvents may used for relatively polar contaminants. As one specific example, bisphenol A may be removed from a molecularly imprinted catalyst by rinsing with a mixture of equal parts by volume of methanol and 2M acetic acid. The rinsing can be repeated as necessary (e.g., one, two, three, or more times) until an acceptable amount of contaminant has been removed. In some embodiments, at least about 50% of the contaminants are removed from the molecularly imprinted structure on the nanoparticles. The contaminant may also be removed by exposing the catalysts to radiation effective to degrade the contaminant.

By removing the contaminants, the methods of the present application may, in some embodiments, produce a cavity configured to selectively receive the contaminants. The cavity may have a spatial configuration that accommodates the contaminant and/or include silane coupling agents configured to form an energetically favorable interaction with the contaminant disposed within the cavity.

The resulting molecularly imprinted catalysts may optionally be isolated from solvent using standard methods after removing at least a portion of the contaminants (e.g., operation 230 as depicted in FIG. 2). As an example, the composition can be centrifuged and dried to isolate the molecularly imprinted catalyst. The dried molecularly imprinted catalyst may optionally be further packaged in a sealed container for subsequent use.

Methods and Apparatuses Including the Molecularly Imprinted Catalysts

Some embodiments disclosed herein include methods for degrading a contaminant. The method can include combining a molecularly imprinted catalyst with a contaminant and exposing the molecularly imprinted catalyst to a radiation effective to degrade at least a portion of the contaminants. The molecularly imprinted catalyst can be any of the molecularly imprinted catalysts disclosed in the present application, and may include molecular-sized cavities configured to selectively receive the contaminant. The contaminant may be any of the contaminants disclosed in the present application (e.g., naphthalene or bisphenol A).

The radiation applied to the molecularly imprinted catalyst may vary, for example, based on the composition of the titania-based catalyst. The radiation can be, for example, ultraviolet or visible light. In some embodiments, the radiation has a wavelength of peak emission of about 200 nm to about 800 nm. As an example, the molecularly imprinted catalyst may include non-doped titania and may be exposed to a radiation having a wavelength of peak emission of about 254 nm. As another example, the molecularly imprinted catalyst may include titania doped with carbon and may be exposed to a radiation having a wavelength of peak emission of about 500 nm.

Without being bound to any particular theory, it is believed that titania in the molecularly imprinted catalyst can absorb radiation that can oxidize or reduce a contaminant at or near the molecularly imprinted catalyst (e.g., contaminant within a molecular-sized cavity). As discussed above, molecular-sized cavities can be configured to selectively receive the contaminant, and therefore the molecularly imprinted catalysts may selectively degrade the contaminant.

In some embodiments, the molecularly imprinted catalysts can be combined with the contaminant by dispersing (e.g., mixing) the molecularly imprinted catalysts in a solution containing the contaminant. Radiation can be applied to the solution to degrade contaminant in the solution. The solution may optionally be mixed at about the same time as applying the radiation.

The amount of the molecularly imprinted catalyst combined with the solution can be, for example, at least about 1 ppm by weight; at least about 10 ppm by weight; at least about 100 ppm by weight; at least about 1000 ppm by weight; or at least about 1% by weight. The amount of the molecularly imprinted catalyst combined with the solution can be, for example, less than or equal to about 10% by weight; less than or equal to about 5% by weight; less than or equal to about 1% by weight; less than or equal to about 5000 ppm by weight. In some embodiments, the amount of the molecularly imprinted catalyst combined with the solution can be from about 1 ppm by weight to about 10% by weight.

In some embodiment, the molecularly imprinted catalysts can be dispersed in a matrix material (e.g., an inert polymer) and the matrix material can be contacted with the contaminant. Radiation can be applied to the matrix material while it is contact with the contaminant. The contaminant may optionally be mixed or flowing in a liquid at about the same time as applying the radiation.

Although some of the methods disclosed herein include applying radiation to the molecularly imprinted catalyst, applying radiation is optional. The molecularly imprinted catalyst may, in some embodiments, exhibit catalytic activity without receiving radiation. The catalytic activity may be reduced relative to the catalytic activity when radiation is applied. Thus, some embodiments disclosed herein include combining the molecularly imprinted catalyst with a contaminant to degrade the contaminant without applying radiation.

Some embodiments disclosed here include a method of treating a sample suspected of containing a contaminant. The method can include providing a sample suspected of containing a contaminant, combining a molecularly imprinted catalyst with the sample, and exposing the molecularly imprinted catalyst to a radiation effective to degrade at least a portion of the contaminant. The molecularly imprinted catalyst can be any of the molecularly imprinted catalysts disclosed in the present application, and may include molecular-sized cavities configured to selectively receive the contaminant that is suspected to be present in the sample. The contaminant may be any of the contaminants disclosed in the present application (e.g., naphthalene or bisphenol A). The radiation can be the same as disclosed in the present application with regard to the method of degrading a contaminant.

The sample suspected of containing the contaminant is not particularly limited. Non-limiting examples of samples include fresh water (e.g., water from rivers, ponds, lakes, etc.), wastewater, sewage, industrial waste, or food.

As discussed above, the molecularly imprinted catalyst may exhibit catalytic activity without receiving radiation. Applying radiation to the molecularly imprinted catalyst is therefore optional. Accordingly, some embodiments disclosed herein include combining a sample suspected of containing a contaminant with the molecularly imprinted catalyst to treat the sample without applying radiation.

Some embodiments disclosed herein include an apparatus for degrading a contaminant. The apparatus can include a molecularly imprinted catalyst and a light source configured to emit radiation that, when received by the molecularly imprinted catalyst in contact with the contaminant, is effective to degrade at least a portion of the contaminant. The molecularly imprinted catalyst can be any of the molecularly imprinted catalysts disclosed in the present application, and may include molecular-sized cavities configured to selectively receive the contaminant that is suspected to be present in the sample. The contaminant may be any of the contaminants disclosed in the present application (e.g., naphthalene or bisphenol A).

The light source may be configured to emit ultraviolet or visible radiation. In some embodiments, the light source may be configured to emit radiation having a wavelength of peak emission from about 200 nm to about 800 nm. In some embodiments, the molecularly imprinted catalyst includes doped titania in the core (e.g., core 110 depicted in FIG. 1) and the light source is configured to emit visible light. In some embodiments, the molecularly imprinted catalyst includes non-doped titania in the core and the light source is configured to emit ultraviolet radiation. Non-limiting examples of light sources include light emitting diodes (LEDs), fluorescent lamps, halogen lamps, lasers, and the like.

The device can include a composition having one or more molecularly imprinted catalysts. The composition may be any of the compositions containing the molecularly imprinted catalyst disclosed in the present application. For example, the composition can be a solid film containing the molecularly imprinted catalyst dispersed within a polymer matrix. As another example, the composition can be a solution having the molecularly imprinted catalysts dispersed within a solvent (e.g., water). In some embodiments, the composition includes from about 1 ppm to about 10% by weight of the molecularly imprinted catalysts.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

EXAMPLES

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Example 1

Preparing Molecularly Imprinted Catalysts for degrading Bisphenol A

Titania nanoparticles (~50 nm diameter) are heated at about 110° C. to remove moisture and activate the catalyst. 1 mmole of bisphenol A, 2 mmole of 3-glycidoxypropyltrimethoxysilane and 0.5 mL of 0.1 M acetic acid are dispersed in about 4 mL of anhydrous ethanol using ultrasonication. After mixing for about 1 hour at room temperature, about 2 mg of the titania nanoparticles are combined with the composition and vigorously mixed for about 12 hours. The resulting molecularly imprinted catalysts are centrifuged and dried for about 12 hours at about 60° C.

The dried molecularly impinted catalysts are rinsed 3 times with a solution containing methanol and 2M acetic acid at equal parts by volume. The removal of bisphenol A can be confirmed by using an ultraviolet-visible spectrophotometer.

Example 2

Preparing Molecularly Imprinted Catalysts for Degrading Benzene

The same process as described in Example 1 is performed, except that 1 mmole of benzene and 1 mmole of phenyltrimethoxysilane are dispersed in anhydrous ethanol rather than bisphenol A and 3-glycidoxypropyltrimethoxysilane.

Example 3

Degrading a Composition Including Bisphenol A

About 2 mg/mL of the molecularly imprinted catalysts are dispersed in an aqueous solution having 2 mM of bisphenol A. While stirring the solution with a magnetic stir bar, ultraviolet radiation is applied (λ~254 nm) using a UV lamp. After applying radiation for about 20 minutes, a sample of the solution is removed and the concentration of bisphenol A determined using high-performance liquid chromatography. The concentration of bisphenol A is less than 2 mM.

Example 4

Treating a Water Sample Suspected of Containing Benzene

A river water sample suspected of containing benzene is treated using the molecularly imprinted catalysts from Example 2. About 2 mg/mL of the molecularly imprinted catalysts are stirred into the sample. Ultraviolet radiation is applied (λ~254 nm) using a UV lamp while stirring the sample for about 20 minutes. The molecularly imprinted catalysts are then removed from the sample using a centrifuge to obtain a treated water sample.

What is claimed is:

1. A molecularly imprinted catalyst comprising:
a core comprising a titania-based photocatalyst; and
a layer at least partially encapsulating the core, the layer comprising titania covalently coupled to one or more silane coupling agents having an organic functional group, wherein the layer further comprises one or more molecular-sized cavities configured to selectively receive one or more contaminants.

2. The catalyst of claim 1, wherein the titania-based photocatalyst comprises at least 50% by weight titania.

3. The catalyst of claim 1, wherein the titania-based photocatalyst comprises doped titania.

4. The catalyst of claim 1, wherein the titania-based photocatalyst comprises an anatase phase.

5. The catalyst of claim 1, wherein the core has a largest dimension less than or equal to about 1 μm.

6. The catalyst of claim 1, wherein the molecular-sized cavities have a largest dimension less than or equal to about 100 nm.

7. The catalyst of claim 1, wherein the silane coupling agents comprise at least one of N-(2-aminoethyl)-3-aminopropyltrimethoxysilane, N-(2-aminoethyl)-3-aminopropylmethyldimethoxysilane, 3-aminopropylmethyldiethoxysilane, 3-aminopropyltriethoxysilane, 3-aminopropyltrimethoxysilane, (N-trimethoxysilylpropyl)polyethyleneimine, trimethoxysilylpropyldiethylenetriamine, 3-chloropropyltrimethoxysilane, 1-trimethoxysilyl-2(p,m-chloromethyl)phenylethane, 2-(3,4-epoxycyclohexyl)ethyltrimethoxysilane, 3-glycidoxypropyltrimethoxysilane, isocyanotopropyltriethoxysilane, bis[3-(triethoxysilyl)propyl]tetrasulfide, 3-mercaptopropylmethyldimethoxysilane, 3-(Amino ethylaminomethyl)-phenyltrimethoxysilane, carboxyethylsilanetriol, N-(3-triethoxysilylpropyl)-4,5-dihydroimidazole, decyltriethoxysilane, hydroxymethyltriethoxysilane, isobutylmethyldimethoxysilane, 3-mercaptopropyltriethoxysilane, phenyltrimethoxysilane, N-trimethoxysilylpropyl-N,N,N-trimethylammonium chloride, ureidopropyltriethoxysilane, or 3-mercaptopropyltrimethoxysilane.

8. The catalyst of claim 1, wherein the contaminants comprise at least one of nerve agents, endocrine disruptors, pharmaceutical compounds, pesticides, proteins, or dyes.

9. The catalyst of claim 1, wherein the contaminants comprises at least one of acetone, acid blue 9, acid yellow 23, acrylamide, alachlor, atrazine, benzene, benzo(a)pyrene, bromodichloromethane, carbofuran, carbon tetrachloride, chlorobenzene, chlordane, chloroform, chloromethane, 2,4-dichlorophenoxyacetic acid, dalapon, 1,2-dibromo-3-chloropropane, o-dichlorobenzene, p-dichlorobenzene, 1,2-dichloroethane, 1,1-dichloroethylene, cis-1,2-dichloroethylene, trans-1,2-dichloroethylene, dichloromethane, 1,2-dichloropropane, di(2-ethylhexyl)adipate, di(2-ethylhexyl)phthalate, dinoseb, dioxin(2,3,7,8-TCDD), diquat, endothall, endrin, epichlorohydrin, ethylbenzene, ethylene dibromide, glyphosate, a haloacetic acid, heptachlor, heptachlor epoxide, hexachlorobenzene, hexachlorocyclopentadiene, lindane, methyl-tertiary-butyl ether, methyoxychlor, napthoxamyl(vydate), naphthalene, pentachlorophenol, phenol, picloram, isopropylbenzene, N-butylbenzene, N-propylbenzene, sec-butylbenzene, polychlorinated biphenyls (PCBs), simazine, sodium phenoxyacetic acid, styrene, tetrachloroethylene, toluene, toxaphene, 2,4,5-TP (silvex), 1,2,4-trichlorobenzene, 1,1,1-trichloro ethane, 1,1,2-trichloroethane, trichloroethylene, a trihalomethane, 1,2,4-trimethylbenzene, 1,3,5-trimethylbenzene, vinyl chloride, o-xylene, m-xylene, p-xylene, a G-series nerve agent, a V-series nerve agent, bisphenol-A, bovine serum albumin, carbamazepine, cortisol, estradiol-17β, gasoline, gelbstoff, triclosan, ricin, a polybrominated diphenyl ether, a polychlorinated diphenyl ether, a polychlorinated biphenyl or a fullerene.

10. The catalyst of claim 1, wherein a molar number of the silane coupling agents in the layer relative to a number of molecular-sized cavities in the layer is from about 0.5 to about 10.

11. The catalyst of claim 1, wherein at least a portion of the silane coupling agents covalently coupled to the titania are configured to hydrogen bond with contaminants received in the molecular-size cavities.

12. The catalyst of claim 1, wherein at least a portion of the silane coupling agents covalently coupled to the titania are configured to form a nonpolar interaction with contaminants received in the molecular-size cavities.

13. The catalyst of claim 12, wherein the nonpolar interaction comprises a pi-stacking interaction.

14. The catalyst of claim 1, wherein the layer comprises one or more pore channels.

* * * * *